(No Model.)

J. W. LINDSAY.
HORSE TAIL HOLDER AND REIN GUARD.

No. 451,608. Patented May 5, 1891.

Witnesses:
H. S. Seitz
W. S. Duvall

Inventor
James W. Lindsay,
By his Attorneys,
C. A. Snow & Co.

UNITED STATES PATENT OFFICE.

JAMES W. LINDSAY, OF FRESNO, CALIFORNIA.

HORSE-TAIL HOLDER AND REIN-GUARD.

SPECIFICATION forming part of Letters Patent No. 451,608, dated May 5, 1891.

Application filed August 13, 1890. Serial No. 361,859. (No model.)

*To all whom it may concern:*

Be it known that I, JAMES W. LINDSAY, a citizen of the United States, residing at Fresno, in the county of Fresno and State of California, have invented a new and useful Horse-Tail Holder and Rein-Guard, of which the following is a specification.

This invention has relation to horse-tail holders or rein-guards, and the objects in view are to provide an attachment for harness adapted to clasp the horse's tail below the root, and while permitting of a free switching of the tail in a lateral direction prevents any raising and swinging of the same so as to take over the reins.

Other minor objects and advantages of the invention will hereinafter appear, and the novel features thereof will be particularly pointed out in the claims.

Figure 1:
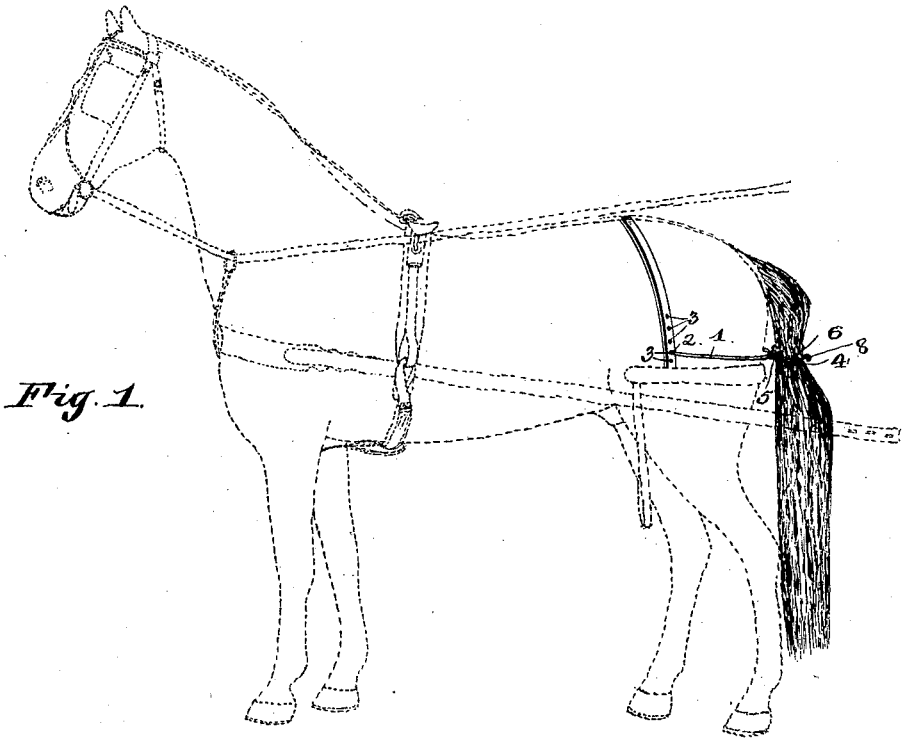
Figure 2:
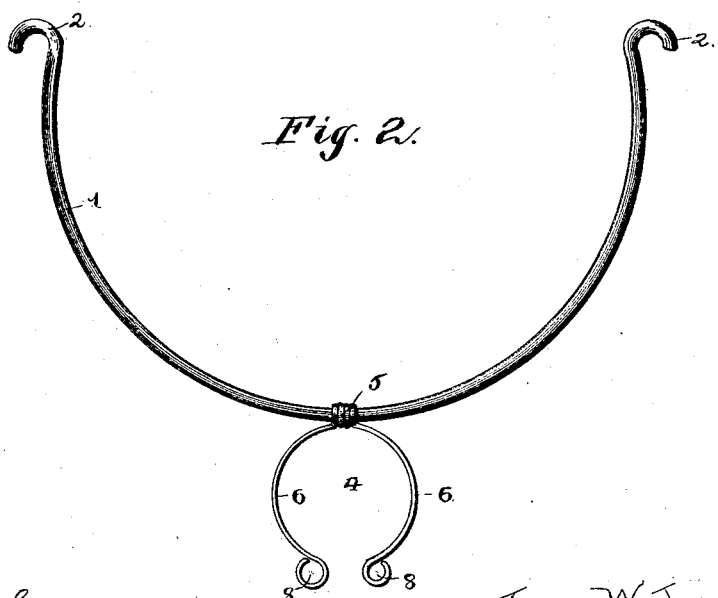

Referring to the drawings, Figure 1 is a perspective of a guard constructed in accordance with my invention, the same being mounted in position upon a horse. Fig. 2 is an enlarged plan of the guard.

Like numerals of reference indicate like parts in all the figures of the drawings.

In practicing my invention I construct a semicircular bow 1 of stiff wire and of a shape and size whereby the same is adapted to conform to the proportions of the hind quarters of a horse. The terminals of the semicircular or bow-shaped guard are bent to form eyes or hooks 2, which engage perforations 3, formed at intervals in the hip-straps of a harness, whereby the guard is held in removable position and may be readily adjusted.

4 designates a clasp or tail-holder, and the same is formed of spring-wire. In constructing the clasp a blank of wire of suitable length is coiled several times at its center, as at 5, the said coils forming an eye disposed in the same direction as the opposite terminals located at each side of the eye. The terminals are then bent into semicircular form or shape and constitute oppositely-curved embracing arms 6, the free ends of which are adjacent to each other and may be either flared to facilitate the introduction of the animal's tail or bent to form eyes 8.

Previous to mounting the guard in position, as illustrated by the drawings and heretofore mentioned, the eye or coil 5 of the clasp is mounted upon the guard and the tail introduced between the embracing eyes, so that the tail is loosely encircled below the root by the holder. It will now be evident that the tail is free to swing laterally, so that the horse may brush away flies, and yet at the same time any circular swinging of the same or lifting of the tail sufficiently far to be thrown across the reins is impossible. In any lateral movement the holder rides back and forth upon the guard, the coil or eye being made large, so that it will not bind upon the guard.

Having thus described my invention, what I claim is—

1. The herein-described rein-guard, consisting of a guard or support adapted for connection to the harness and of a tail-holder formed of spring-wire bent to form a spring-coil 5 for loosely receiving the guard, and at each side of the coil with curved arms 6, substantially as specified.

2. The bow-shaped guard 1, terminating in hooks or eyes 2, adapted to pass through perforations formed in the hip-straps of a harness, and the tail-holder, the same consisting of the central spring-coil 5 for loosely receiving the guard, and provided at each side of the coil with curved arms 6, diverged to form the tail-embracing portion and terminating in the eyes 8, substantially as specified.

In testimony that I claim the foregoing as my own I have hereto affixed my signature in presence of two witnesses.

JAMES W. LINDSAY.

Witnesses:
J. W. CROW,
D. P. BASSATT.